United States Patent [19]

Kanno et al.

[11] Patent Number: 5,205,781

[45] Date of Patent: Apr. 27, 1993

[54] PRELIMINARY VENTILATION DEVICE FOR VEHICLES

[75] Inventors: Yoshihisa Kanno; Shinshi Kajimoto, both of Hiroshima; Masayuki Jinno, Higashihiroshima; Akihiro Furuzawa, Kure, all of Japan

[73] Assignees: Naldec Corporation; Mazda Motor Corporation, Hiroshima, Japan

[21] Appl. No.: 921,998

[22] Filed: Aug. 4, 1992

Related U.S. Application Data

[63] Continuation of Ser. No. 822,102, Jan. 17, 1992, abandoned.

[30] Foreign Application Priority Data

Jan. 18, 1991 [JP] Japan .................................. 3-004585
Jan. 18, 1991 [JP] Japan .................................. 3-004586
Dec. 25, 1991 [JP] Japan .................................. 3-343574

[51] Int. Cl.$^5$ .................................................. B60H 1/26
[52] U.S. Cl. .................................. 454/164; 62/235.1; 454/141; 454/900
[58] Field of Search ................. 454/75, 141, 162, 164, 454/165, 900; 62/235.1

[56] References Cited

U.S. PATENT DOCUMENTS 4,804,140  2/1989  Cantrell .......................... 454/141 X
5,040,455  8/1991  Doi .................................. 454/900 X Primary Examiner—Robert G. Nilson

[57] ABSTRACT

In a vehicle incorporating a control device connected to a solar battery, a storage battery, an operation unit, a first ventilating fan 3 and a second ventilating fan 4, when the operation mode is set by a change-over operation of the operation unit 2 to a parking ventilation mode in which the first and second ventilating fans 3 and 4 are driven by supply of an electromotive force of the solar battery 6, a voltage and a current from the electromotive force of the solar battery 6 are gradually increased and continuously applied to the fan to perform gradual activation of the first ventilating fan 3. Thereafter, a switch unit 26 is closed, and the voltage and the current from the electromotive force of the solar battery are thereby simultaneously applied to the second ventilating fan 4, thus completing activation of the first and second ventilating fans.

19 Claims, 16 Drawing Sheets

| | FORCED VENTILATION IS ON | | OFF | | PARKING VENTILATION IS ON | | |
|---|---|---|---|---|---|---|---|
| OPERATION SWITCH 2 | FORCED VENTILATION IS ON | | OFF | | PARKING VENTILATION IS ON | | |
| IG SWITCH 8 | ON | NOT ON | ON | NOT ON / KEY INSERTED | KEY REMOVED | | |
| TEMPERATURE OF OUTDOOR | — | — | — | — | ≤ 7°C | 7~15°C | ≥ 15°C |
| POWER SOURCE TIMER | — | — | FORCED VENTILATION FOR TEN MINUTES AFTER ON | — | — | — | — |
| MODE | FORCED VENTILATION | CHARGING | FORCED VENTILATION | CHARGING | CHARGING | CHARGING OR PARKING VENTILATION | PARKING VENTILATION |

FIG. 6

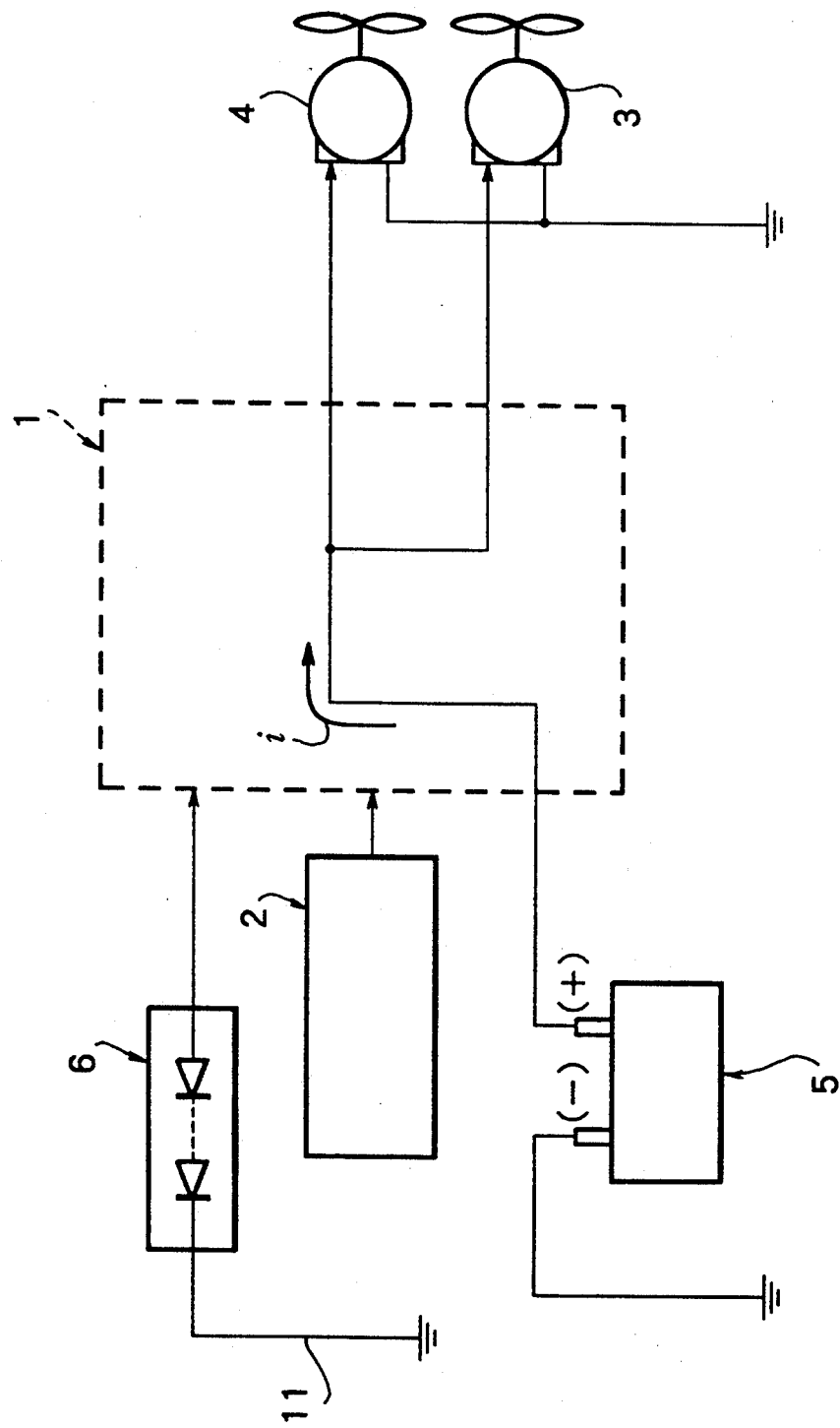

PRELIMINARY VENTILATION DEVICE FOR VEHICLES

This application is a continuation of application Ser. No. 07/822,102, filed Jan. 17, 1992, now abandoned.

BACKGROUND OF THE INVENTION

1. Field of the Invention

The present invention relates to a preliminary ventilating device for vehicles which is of the type which employs, for example, solar cells and a storage battery which is secondary cells as auxiliary and main power sources, respectively.

2. Prior Art

Japanese Patent Publication No. 51451/1984 discloses a vehicle in which parking ventilation is performed, i.e., the interior thereof is ventilated while the vehicle is parked, by a ventilation fan serving as ventilation means which is driven by the electromotive force from a solar battery.

Japanese Patent Laid-Open No. 1-172016 discloses a ventilation system for vehicles to eliminate an excessive increase in the temperature of the interior of the vehicle which occurs when the vehicle has been parked for a long time under a scorching sun in summer time, because it makes a driver or passenger uncomfortable when they get in the vehicle and it takes some time for an air conditioner to lower the temperature to a comfortable level. In Japanese Patent Laid-Open No. 172016, a ventilation fan, serving as ventilation means, automatically operated when the temperature of the interior of the parked vehicle reaches a predetermined value or above, is provided, and parking ventilation is performed, i.e., the air in the interior of the vehicle is replaced with fresh air, by the operation of such a ventilation fan. This ventilation fan is driven by the solar battery which sends out an output voltage corresponding to the amount of sunlight it receives.

Ventilating fans are driven by a d.c. motor. FIG. 15 shows an activation characteristic curve of this d.c. motor for the ventilating fans and voltage-current characteristic curves of the solar battery. As can be seen in FIG. 15, although a d.c. motor activation characteristic curve R generally exhibits a proportional tendency, it has a first current peak RA and a second current peak RB at low voltages. Hence, to activate the d.c. motor, current and voltage are continuously and gradually increased toward the first peak RA from a low voltage, and the motor is activated when the first peak RA has been reached. The present inventors call this generally employed activation method "gradual starting".

The solar battery output voltage and current characteristic Y varies depending on the amount of sunlight the solar battery receives. When the amount of sunlight that the solar battery receives is a maximum, like, for example, in summertime, the solar battery generates a voltage current characteristic Y1 indicated by the broken line. As the amount of sunlight that the solar battery receives decreases, voltage and current on the voltage and current characteristic generated by the solar battery decrease substantially uniformly, that is, the solar battery generates a voltage current characteristic Y2 or Y3. To activate the d.c. motor reliably using a solar battery exhibiting the voltage current characteristic Y, an activation method different from the aforementioned one is employed. In this method, an open voltage current of the solar battery which serves as a reference for determination of the voltage current characteristic is measured, and then voltage and current required for activation are applied to the d.c. motor simultaneously. Hence, the present inventors call this activation "simultaneous start".

The present inventors have confirmed that this simultaneous starting method is particularly effective when a voltage current characteristic Y contains the first and second peaks RA and RB within its range. It has also been confirmed that the motor can be activated not only by a solar battery which exhibits the voltage current characteristic Y1 containing both the first and second peaks RA and RB in its range but also by a solar battery which exhibits the voltage current characteristic Y2 containing only the lower second peak RB in its range.

When a sufficient amount of sunlight cannot be obtained and only the voltage current characteristic Y3 of the solar battery is obtained, since the voltage current characteristic Y3 does not exceed the second peak RB, the aforementioned simultaneous starting cannot be performed.

If simultaneous activation is attempted when the voltage current characteristic Y3 is obtained, simultaneous activation cannot succeed and the d.c. motor is rendered in a locked state in which a rotor and a stator are magnetically attracted to each other. Such a locked state may not be released even if the amount of sunlight gradually increases afterwards and the solar battery recovers an electromotive force exhibiting the voltage current characteristic Y2 which allows for simultaneous starting.

There has been a demand for quick reduction in high temperatures of the compartment of the vehicle by ventilation even when a sufficient amount of sunlight cannot be obtained, like in the morning in summer or in a tropical region.

To meet such a demand, activation of the ventilating fans must be initiated when the amount of sunlight is not sufficient but when the electromotive force of the solar battery has increased to a certain value.

SUMMARY OF THE INVENTION

In view of the aforementioned problems of the conventional techniques, a primary object of the present invention is to provide a preliminary ventilating device for vehicles which enables ventilation to be performed reliably in the parking ventilation mode by means by a first ventilating fan to reduce a high temperature of the air in the vehicle when a sufficient amount of sunlight cannot be obtained but when the temperature of the air in the vehicle is high.

A second object of the present invention is to provide a preliminary ventilating device for vehicles which enables ventilation by means of a second ventilating fan as well as by a first ventilating fan to be performed reliably to reduce the temperature of the air in the vehicle when the amount of sunlight has increased.

A third object of the present invention is to provide a preliminary ventilating device for vehicles which enables the second ventilating fan to be activated at the earliest time even when it takes time for a sufficient amount of sunlight to activate the second ventilating fan to be obtained.

To achieve the aforementioned objects, the present invention provides a preliminary ventilating device for vehicles which includes a gradual starting means for activating a first ventilating fan in ventilating fans by gradually increasing and continuously applying a voltage and a current from an electromotive force supplied from a solar battery, a switch means operated between a closed state in which the voltage and the current from the electromotive force supplied from the solar battery are simultaneously applied to the second ventilating fan and an opened state in which the voltage and the current are not applied to the second ventilating fan. When the parking ventilation mode is set, the second ventilating fan is activated by the operation of the switch means after the first ventilating fan has been activated by the gradual starting means.

In a preferred form, the preliminary ventilating device further includes a control means connected to the switch means and having a timer means, and an activation detection means for detecting an activated state of the second ventilating fan. When the activation detection means detects that the second ventilating fan is not activated by the operation of the switch means, passage of a predetermined time is checked by means of the timer means, and then the closing operation of the switch means is repeated to activate the second ventilating fan.

In another preferred form, the preliminary ventilating device further includes a number of non-operation times detection means for detecting a number of times the second ventilating van is not activated by the application of the voltage and current by means of the switch means, and a set time changing means for increasing time intervals of the operation of the switch means when the number of non-operation times has reached a predetermined number of times. Application by means of the switch means is repeated to activate the second ventilating fan at an early Other features and advantages of the present invention will be apparent from the following description taken in connection with the accompanying drawings.

BRIEF DESCRIPTION OF THE DRAWINGS

FIG. 6 is a table of operation mode;

FIG. 7B is a block diagram showing forced exhaust mode in the table shown in FIG. 6;

DETAILED DESCRIPTION OF THE PREFERRED EMBODIMENTS

Figure 1:
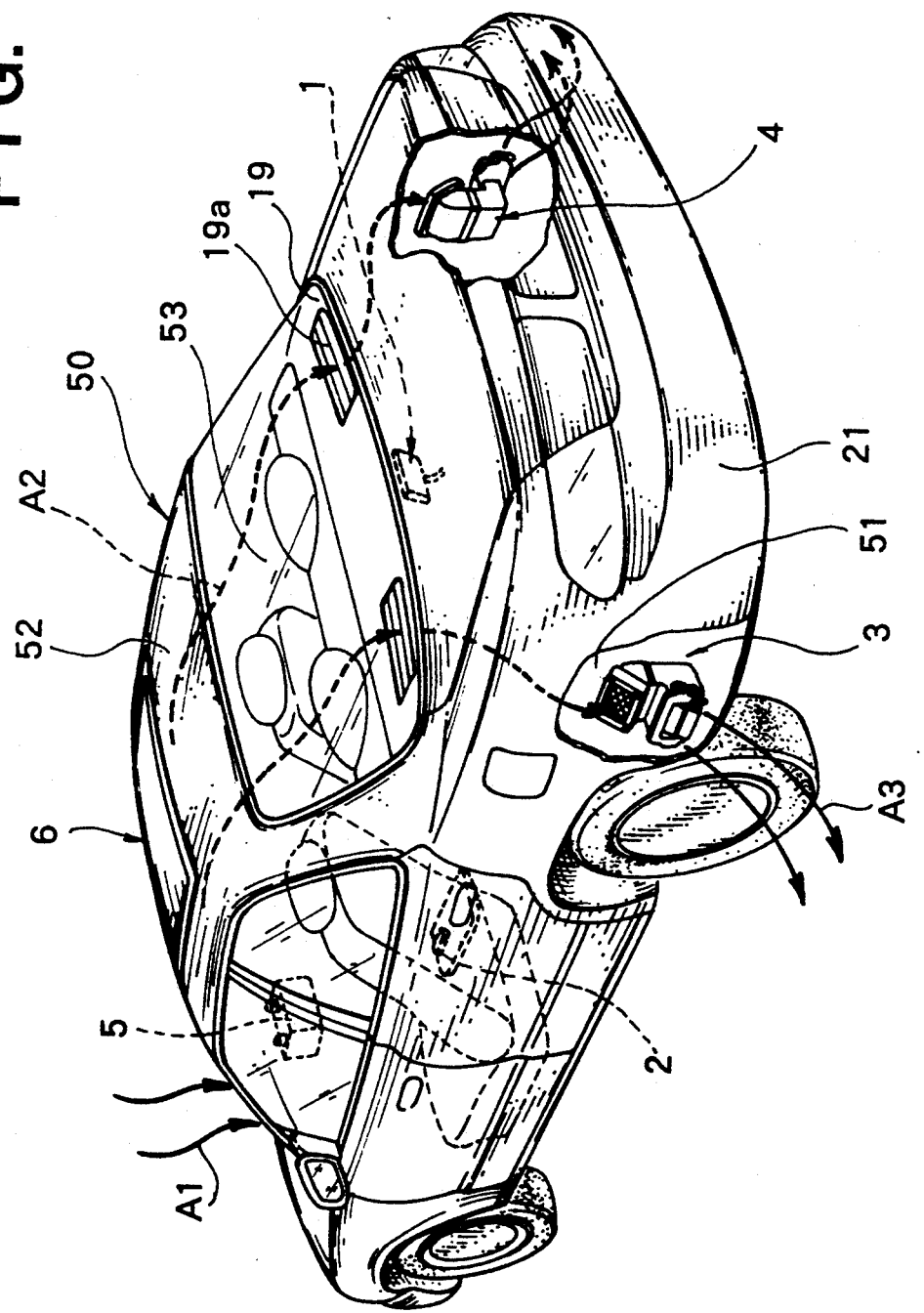
FIG. 1 is a perspective view of a vehicle 50 with a preliminary ventilating device mounted thereon, as seen when looking from the rear and left thereof.

A preferred embodiment of the present invention will now be described with reference to the accompanying drawings. FIG. 1 is an illustration of a passenger car 50 with a preliminary ventilating device mounted thereon, as seen when looking from the left and rear side thereof, partly broken away and the interior thereof being seen through.

In FIG. 1, a known storage battery 5, which is the secondary cells that can be charged and discharged repeatedly, is disposed in an engine compartment in the front portion of the passenger car 50, and a solar battery 6 made of amorphous silicon is disposed on the front portion of a roof 52. The solar battery 6 has the photoelectric conversion function and passes an adequate amount of light. It is also used as a window member of a sun roof. In a trunk 51, a first ventilating fan 3 is provided at one side thereof, and a second ventilating fan 4 is disposed at the other side thereof. Both the ventilating fans 3 and 4 communicate with a vent 19a in a rear tray 19 via special ventilation passages (not shown), respectively. They are connected to a control device 1 provided in the trunk 51 so that they can be controlled under predetermined conditions. An operation switch 2 operated to select either of the ventilation modes, which will be described later, is provided on an operation panel between a driver's seat and a passenger's seat. The operation switch 2 is connected to the control device 1.

In the preliminary ventilating device arranged in the aforementioned manner, drive of the first and second ventilation fans 3 and 4 is controlled in the manner described later on the basis of the operation of the operation switch 2 so as to introduce an air A1 from a vent of a ventilation device provided in the front of the passenger car 50 into an passenger compartment 53, to replace a high temperature air A2 in the passenger compartment with the air A1, and then to discharge an exhaust A3 from the vent 19a in the rear tray 19 by the first and second ventilation fans 3 and 4 toward the rear side of a bumper 51.

Figure 2:
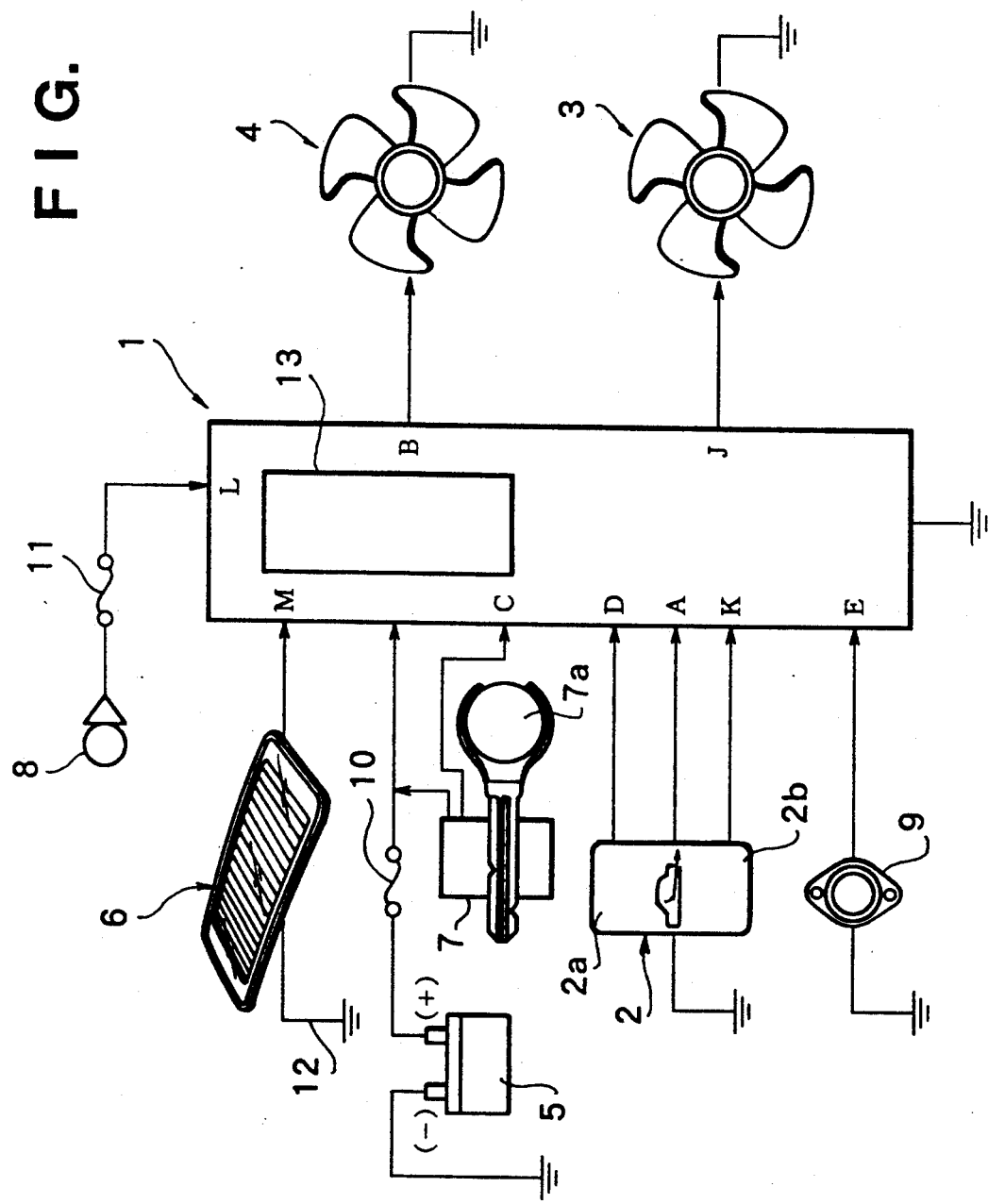
FIG. 2 is a block diagram of a control device 1.
Figure 3:
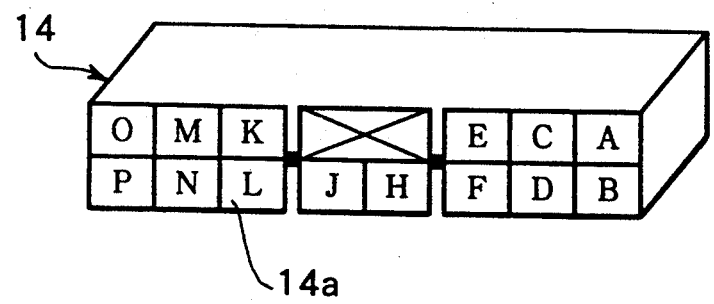
FIG. 3 is an illustration of an external view of a connector for the control device 1.

Turning to FIG. 2 which is a block diagram of the control device 1, the control device 1 includes a microprocessor 13 (hereinafter referred to as a CPU) for executing various control operations on the basis of the signals input thereto, and driving circuits which will be described later. The control device 1 is accommodated in a box shown in FIG. 1. The control device 1 is connected to the first and second ventilating fans 3 and 4 and other components through pins 14a of a connector 14 provided integrally with the control device 1 so as to facilitate assembly and maintenance. The pins 14a are arranged in the manner shown in FIG. 3.

As shown in FIG. 2, an ignition switch 8 (hereinafter referred to as an IG switch) for detecting the operation of an engine is connected to the control device 1 through a fuse for an air conditioner power source. A negative side of the aforementioned solar battery 6 is connected to a grounding conductor 12 of the car body, and a positive side thereof is connected to the control device 1. A negative side of the storage battery 5 is connected to the grounding conductor 12, and a positive side thereof is connected to the control device through a fuse 10 for an interior power source. A key detecting switch 7 for detecting the presence/absence of an engine key 7a used to operate the IG switch 8 is connected to a line which connects the control device 1 and to the positive side of the storage battery 5.

The operation switch 2 is connected to the grounding conductor 12. Individual signal lines which respectively indicate the operated states of the operation switch 2 are connected to the control device 1. A temperature sensor 9 is provided integrally with the first ventilating fan 3. The temperature sensor 9 is connected to the control device 1 so that the results of the detection of the outside air temperature can be input to the control device 1 so as to allow controls which will be described later to be executed.

Figure 4:
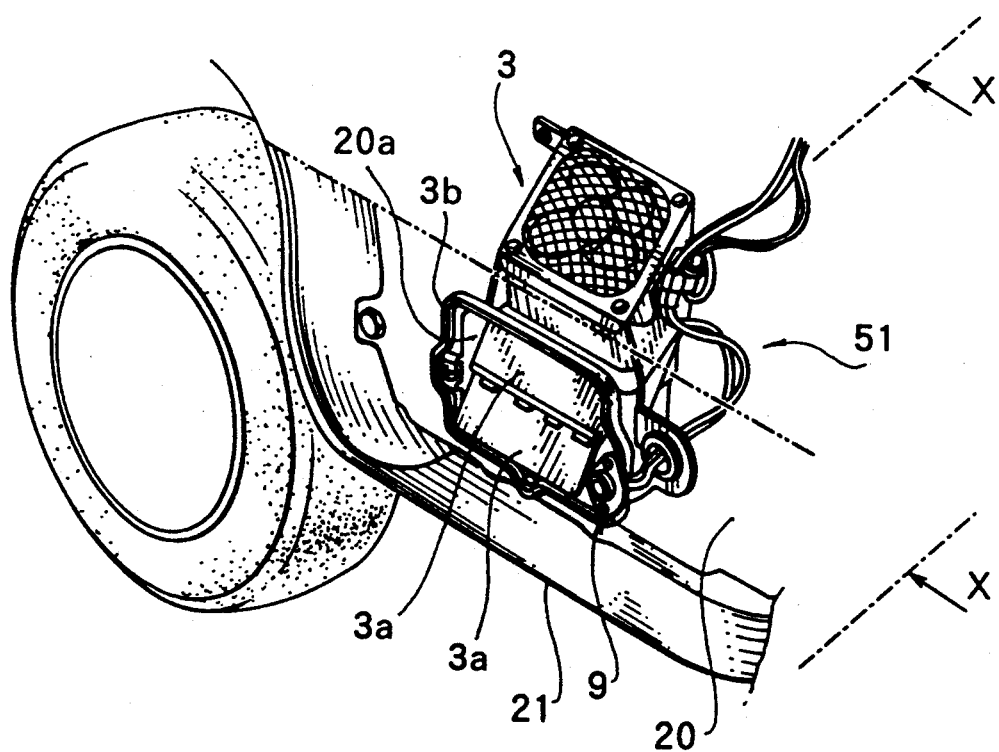
FIG. 4 illustrates how a first ventilating fan 3 is mounted.
Figure 5A:
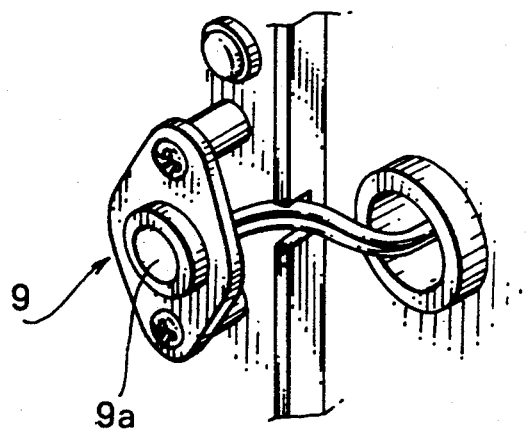
FIG. 5A shows an external view of a temperature sensor 9 in an enlarged fashion.
Figure 5B:
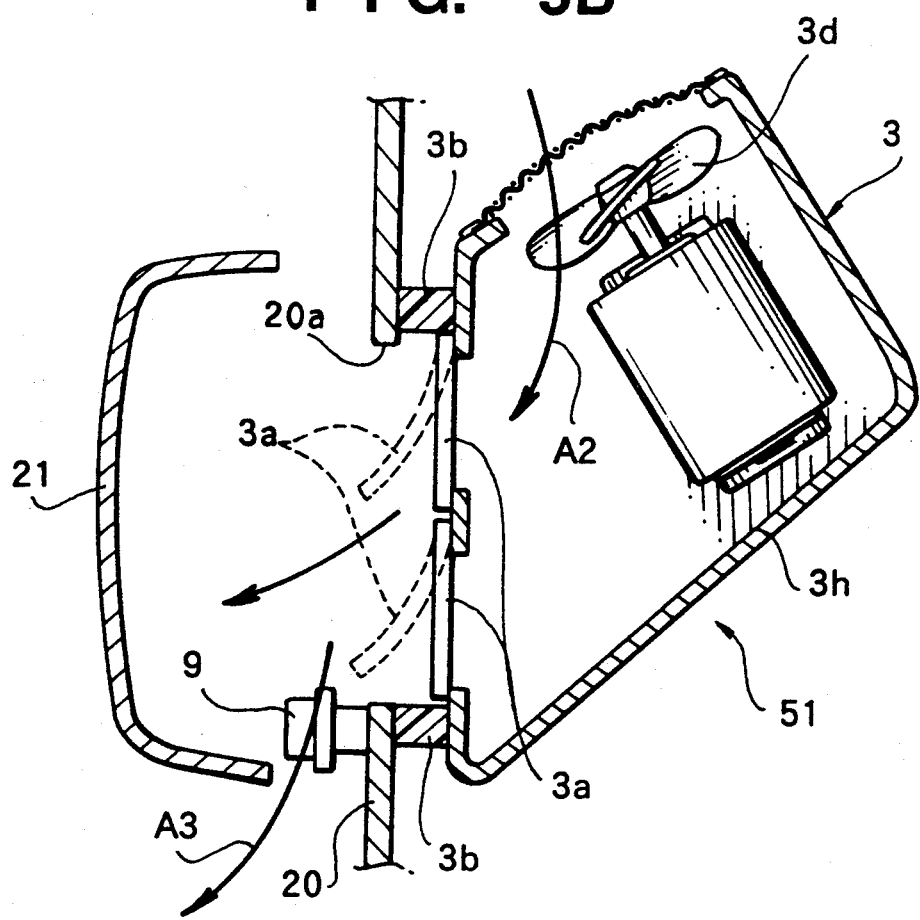
FIG. 5B is a cross-section taken along a line X—X of FIG. 4.

FIG. 4 illustrates how the first ventilating fan 3 is mounted, FIG. 5A is an enlarged view of the temperature sensor 9, and FIG. 5B is a section taken along a line X—X of FIG. 4. The first and second ventilating fans 3 and 4 shown in FIG. 4 have substantially the same structure with the exception that the second ventilating fan 4 has no temperature sensor 9, and are mounted in the same manner. In the present embodiment, two ventilating fans are provided in the trunk. However, there is no limitation to the number of ventilating fans provided in the trunk. Where only one ventilating fan is disposed, however, either gradual activation or simultaneous activation is executed.

As shown in FIG. 4, the first ventilating fan 3 is fixed to a side panel 20 with a sponge rubber-like sealing member 3b therebetween. The sealing member 3b hermetically seals the periphery of an opening 20a formed in the lower portion of the side panel 20 of the trunk 51. The temperature sensor 9 is fixed in the vicinity of the opening 20a such that a sensor portion 9a thereof is directed outward, as shown in FIG. 5A, so as to detect the temperature of the rear side of the bumper 21. Lids 3a made of rubber are provided in two stages at an exhaust outlet portion of the ventilating fan 3. The upper edge portion of each of the lids 3a is supported such that the lid can be automatically opened and closed in accordance with the drive of the ventilating fan 3.

When the ventilating fan 3 or 4 is driven, each of the lids 3a is moved to a position indicated by a broken line due to the air pressure, as shown in FIG. 5B, and the exhaust air A3 is thereby discharged to the outside from between the rear side of the bumper 21 and the side panel 20. When the drive of the ventilating fan 3 or 4 is stopped, the lid 3a made of rubber returns to the position indicated by the solid line due to its own weight, and thereby prevents the air or rain drops from flowing into the trunk 51. Since the side panel 20 in which the opening 20a is formed is located at the rear of the bumper 21, the appearance of the vehicle is not spoiled, and the lids 3a are not directly exposed to the wind or rain. Also, the temperature sensor 9 may not be soiled.

The ventilating fans connected to the control device and provided within the trunk are driven in accordance with the operated state of the operation switch 2, the presence or absence of the IG switch 8, the temperature of the atmosphere and the open-circuit voltage of the solar battery by the control device which automatically sets the operation mode of the ventilating fans.

Figure 7A:
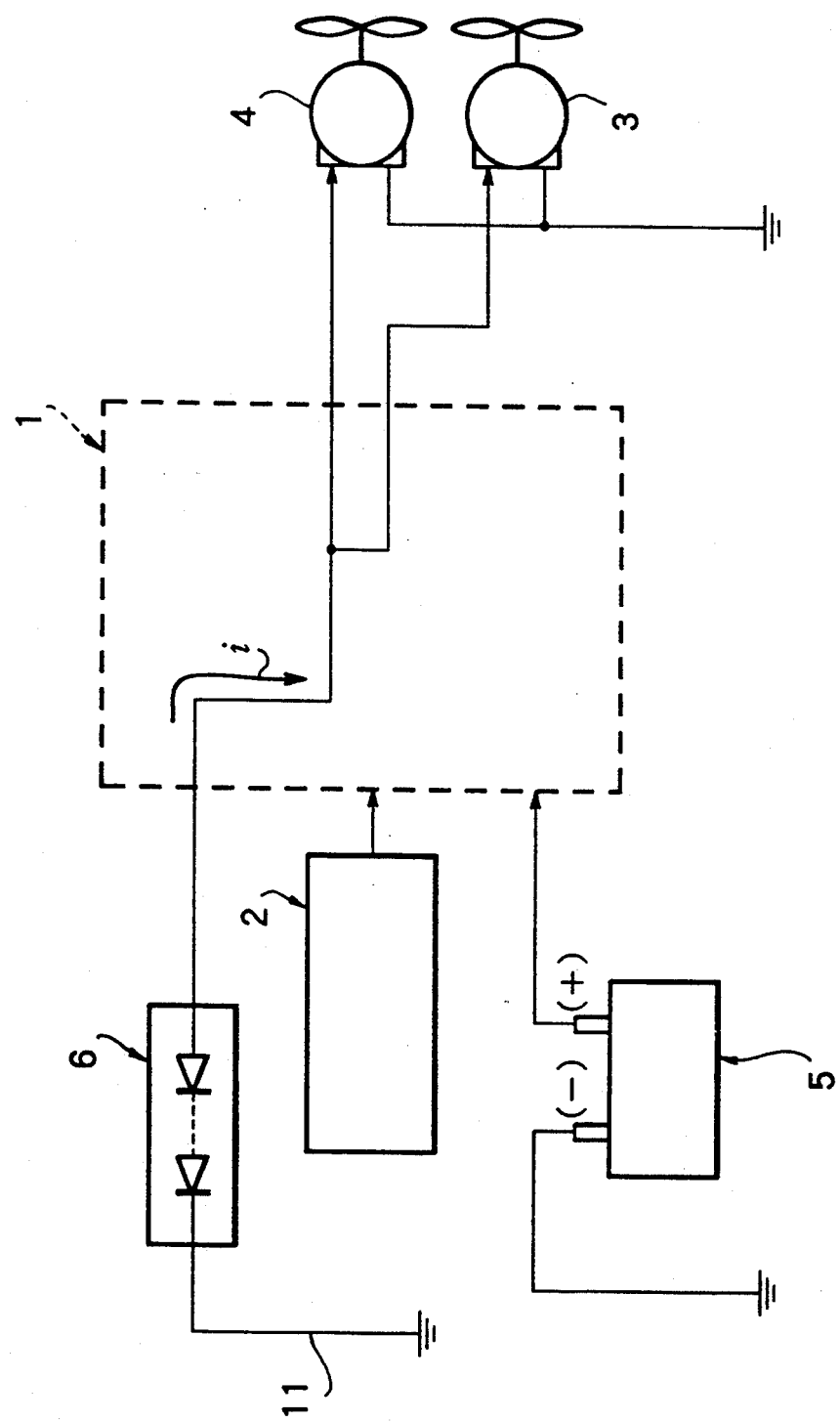
FIG. 7A is a block diagram showing parking ventilation mode in the table shown in FIG. 6.
Figure 7C:
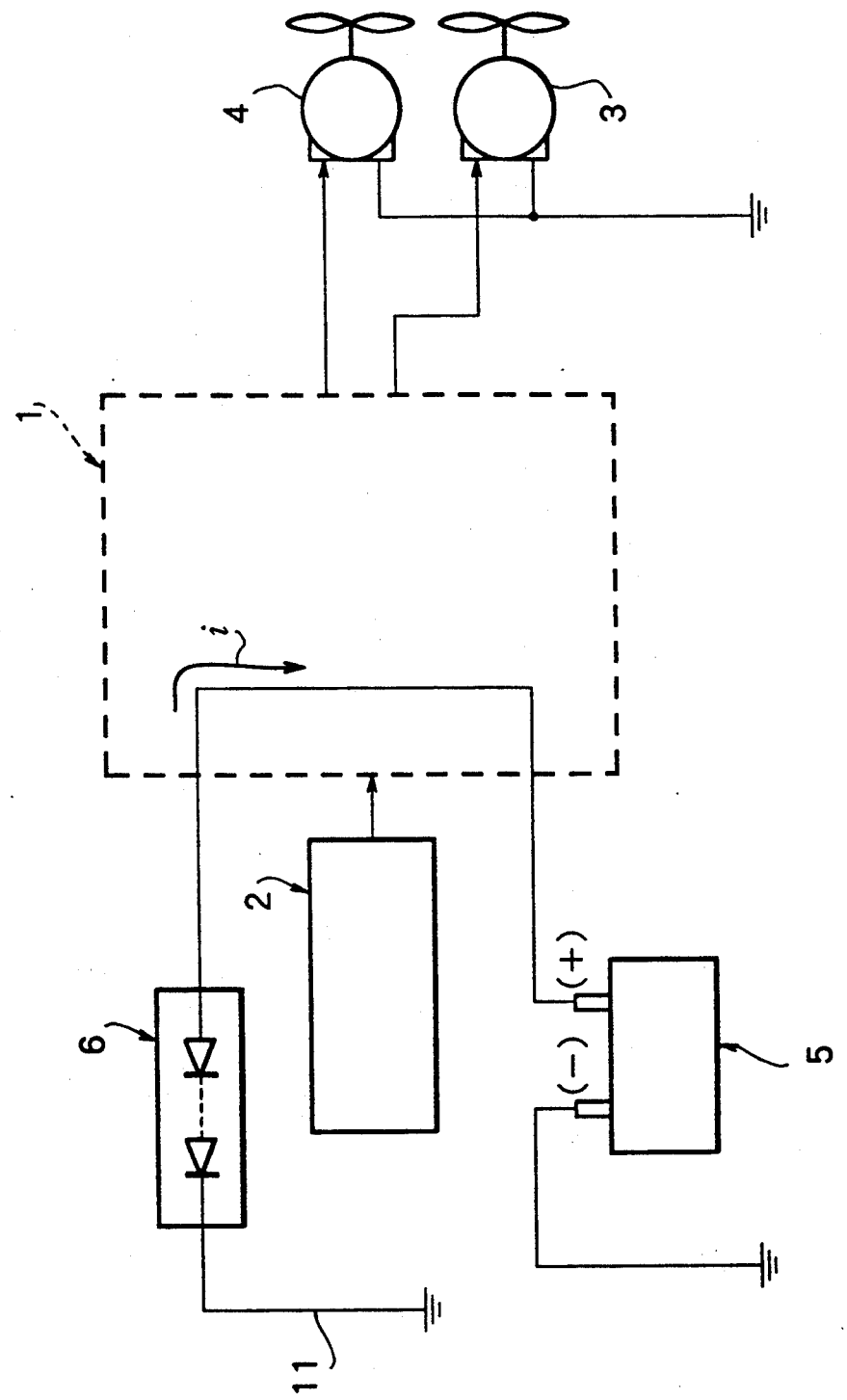
FIG. 7C is a block diagram showing charging mode in the table shown in FIG. 6.

Turning to FIGS. 6, 7A through 7C, when the operation switch 2 is positioned to the forced ventilation side during the operation of the engine, the forced ventilation mode shown in FIG. 7B is set, and the ventilating fans 3 and 4 are driven in that mode. When the operation switch 2 is pressed to the forced ventilation side 2a while the engine is at a stop, the charging mode shown in FIG. 7C is set, and charging from the solar battery is thereby performed.

When the operation switch 2 located at the neutral off position is changed over to the forced ventilation position while the engine is operating, forced ventilation is conducted for ten minutes by the action of a power source timer. When the operation switch 2 is located at the neutral off position while the engine is at a stop, the charging mode shown in FIG. 7C is set.

When the IG key 7a is inserted although the engine is at a stop and when the operation switch 2 is locked to the parking ventilation side, the charging mode is obtained. When the driver removes the IG key 7a and then gets out of the car after he or she stops the engine, and when the outside air temperature is 7° C. or below, the preliminary ventilating device is operated in the charging mode.

When the driver removes the IG key 7a and then gets out of the car after he or she stops the engine, and when the outside air temperature is between 7° C. and 15° C., the preliminary ventilating device is operated in the charging mode or parking ventilation mode. When the driver removes the IG key 7a and then gets out of the car after he or she stops the engine, and when the outside air temperature is 15° C. or above, the preliminary ventilating device is operated in the parking ventilation mode shown in FIG. 7A.

Figure 8:
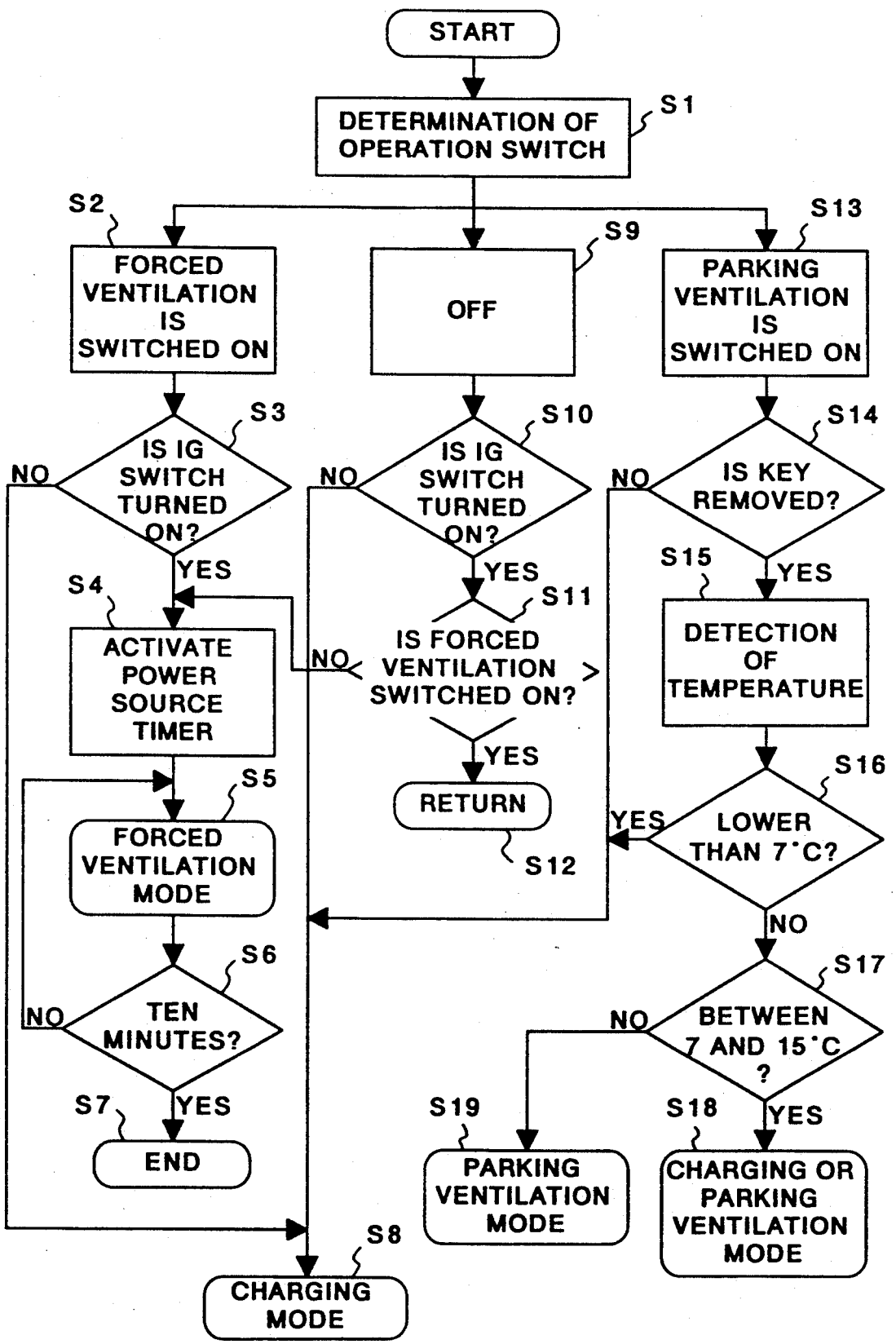
FIG. 8 is a flowchart of the control operation for setting the operation mode.

The aforementioned automatic mode setting is performed on the basis of the control flowchart shown in FIG. 8 by the CPU 13 incorporated in the control device 1. More specifically, after the operation of the control device 1 having the configuration shown in FIG. 2 is initiated, the operated state of the operation switch 2 is determined in step S1. If the operation switch 2 is located at the forced ventilation position, the process goes to step S2. Thereafter, it is determined in step S3 whether or not the IG switch 8 is turned on and the engine is thereby operated. If it is determined that the engine is at a stop, the process goes to step S8 and the charging mode is set. If it is determined in step S3 that the IG switch 8 is turned on and the engine is running, the power source timer is activated in step S4, and then the forced ventilation mode is set to drive the ventilation fans in step S5. Thereafter, it is determined in step S6 whether or not about ten minutes has elapsed since the power source timer is activated. If the answer is yes, drive of the ventilation fans is stopped in step S7.

If it is determined in step S1 that the operation switch 2 is located at the neural off position, the process goes to step S10, and it is determined whether or not the IG switch is turned on and the engine is thereby operating. If it is determined that the engine is at a stop, the process goes to step S8 and the charging mode is set. If it is determined in step S10 that the IG switch 8 is turned on and the engine is operating, the process goes to step S11 and it is determined whether or not the operation switch is located at the forced ventilation position. If the operation switch is located at the forced ventilation position, the process proceeds to step S4, and forced ventilation is executed for ten minutes. If it is determined in step S11 that the operation switch is not located at the forced ventilation position 2a, the process returns to the initial state in step S12.

If it is determined in step S1 that the operation switch 2 is locked to the parking ventilation position, the process goes to step S14, and it is determined whether or not the IG key 7a is inserted by means of the key detection switch 7. If it is determined that the IG key 7a is inserted, the charging mode is set in step S8. If it is determined that the IG key 7a is not inserted by means of the key detection switch 7, the process goes to step S15 and the temperature measurement is executed by means of the temperature sensor 9. At that time, if the outside air temperature is equal to or lower than, for example, 7° C., i.e., if an increase in the temperature of the air in the interior of the vehicle does not occur, the charging mode is set in step S8. If it is determined in step S16 that the outside air temperature is equal to or higher than 7° C., the process proceeds to step S17 and it is determined whether or not the outside air temperature is between 7° C. and 15° C. If the outside air temperature is equal to or higher than 15° C., the parking ventilation mode is set in step S19. In this parking ventilation mode, power is supplied from the solar battery 6.

If it is determined in step S17 that the outside air temperature is between 7° C. and 15° C., the process goes to step S18 and either the charging mode or the parking ventilation mode is set in accordance with the amount of sunlight received by the solar battery. Thus, the control device 1 automatically sets the operation mode. Next, the operation of the charging mode and that of the parking ventilation mode will be described in detail below.

Figure 9:
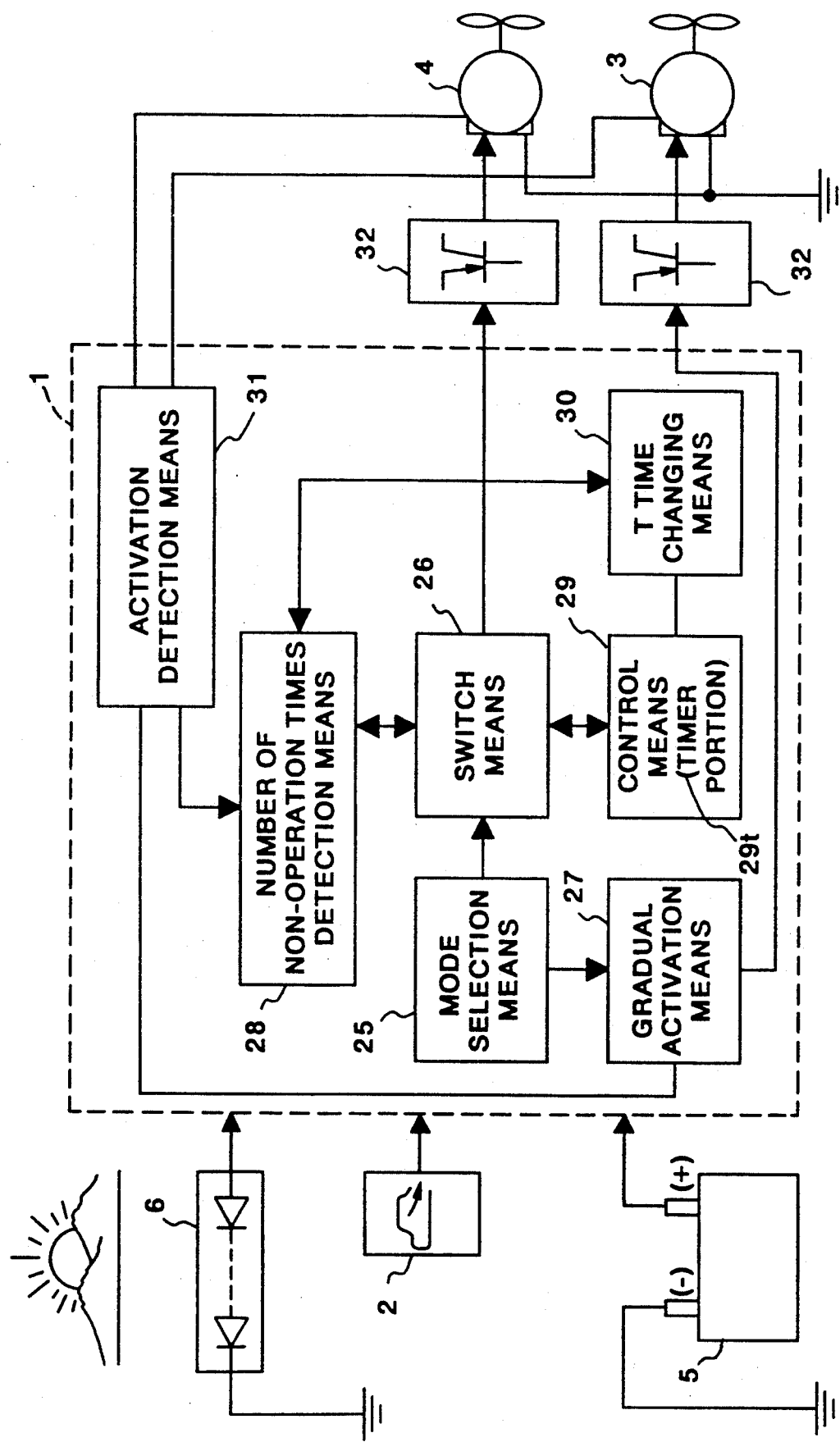
FIG. 9 is a block diagram of a structure which functions when the parking ventilation mode is set.

FIG. 9 is a diagrammatic view of a structure which functions when the parking ventilation mode is set. In FIG. 9, the solar battery 6, the operation switch 2 and the storage battery 6 are connected to the control device 1 indicated by the broken line. Both a negative electrode of the first ventilating fan 3 and a negative electrode of the second ventilating fan 4 are grounded, while both a positive electrode of the first ventilating fan 3 and a positive electrode of the second ventilating fan 4 are connected to the control device 1 through drivers 32 each of which may be constructed by a transistor and other components In the control device 1, a mode selection means 25 for determining the operated state of the operation switch 2 and for making a selection of the operation mode on the basis of the results of the determination is connected to a gradual activation means 27 for performing gradual activation of the first ventilating fan 3, which is in turn connected to an activation detection means 31 for detecting an activated state of the first ventilating fan 3. The operated state of the first ventilating fan 3 is detected so as to enable simultaneous activation of the second ventilating fan 4 to be started after the first ventilating fan 3 has been activated.

The second ventilating fan 4 is connected through the driver 32 to a switch means 26 for simultaneously applying the voltage and current generated by an electromotive force from the solar battery 6 to the second ventilating fan 4. The second ventilating fan 4 is also connected to the activation detection means 41 for detecting the activated state of the second ventilating fan 4. A number of times the second ventilating fan 4 cannot be activated, which is detected by the activation detection means 31, is input to a number of non-operation times detection means 28 which outputs it to the switch means 26. Also, the switch means 26 is connected to a control means 29 including a timer portion 29t, which is in turn connected to a set time changing means 30 for changing a set time (T) in accordance with the number of non-operated times from the number of non-operation times detection means 29.

Figure 10:
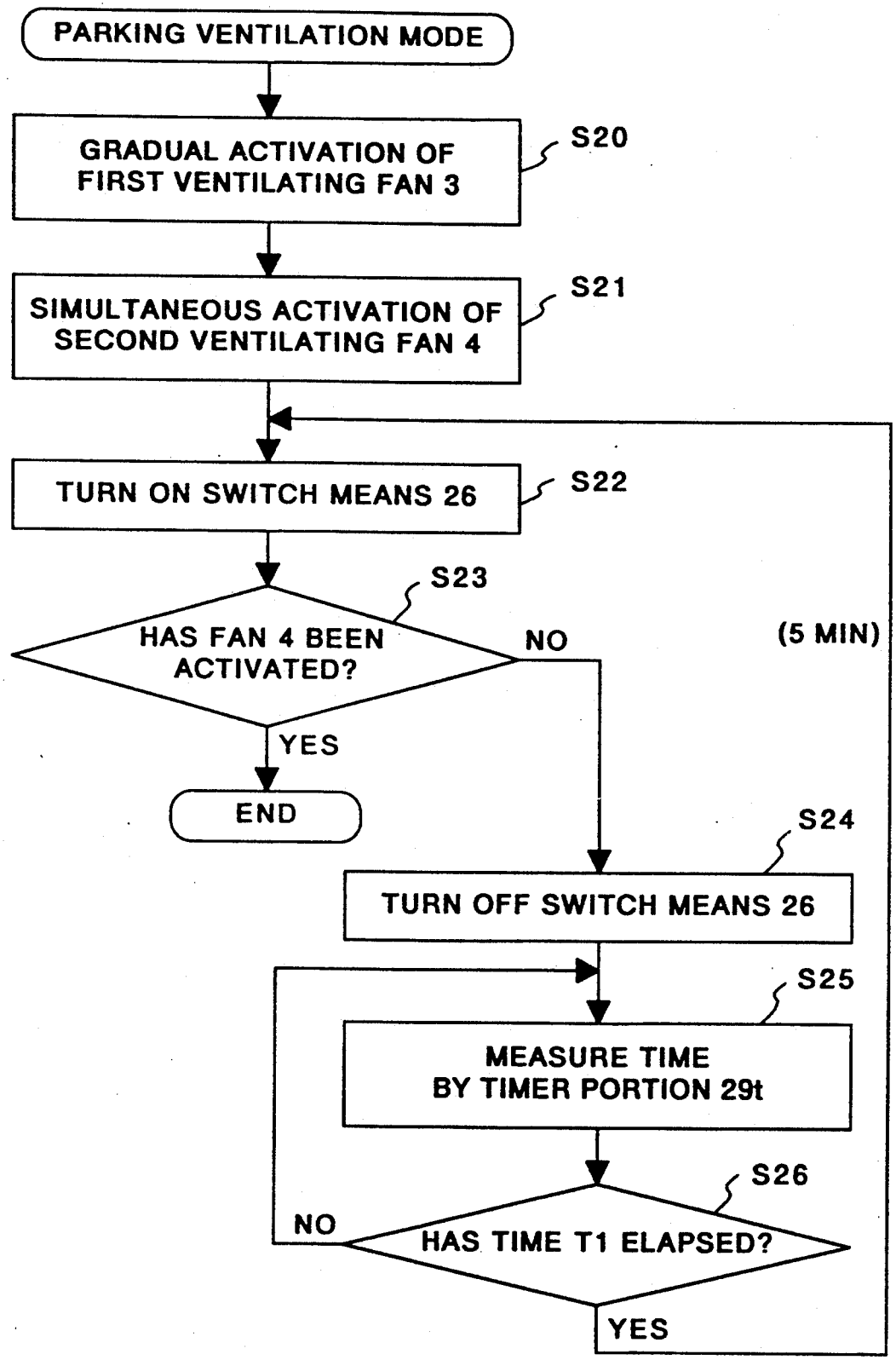
FIGS. 10 and 11 are flowcharts showing the control operation in the parking ventilation mode.
Figure 15:
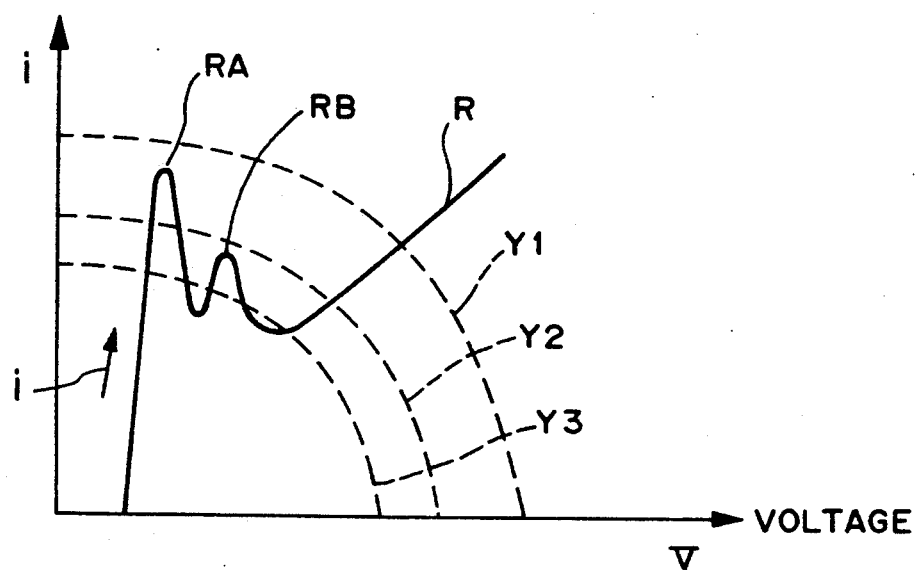
FIG. 15 illustrates the relationship between activation characteristic curve R of a d.c. motor and voltage-current curve Y of a solar battery.

FIG. 10 is a flowchart showing a first example of the control operation in the parking ventilation mode which is executed by the structure shown in FIG. 9. When the parking ventilation mode is set by the control device in the manner shown in FIG. 8, gradual activation of the first ventilating fan 3 is performed in step S20. At that time, activation of the first ventilating fan 3 is checked on the basis of the signal from the activation detection means 31. If activation of the first ventilating fan 3 cannot be performed in step S20, it is determined that there is no sufficient amount of sunlight, and drive of the ventilating fans by the electromotive force of the solar battery is thus suspended. If activation of the first ventilating fan 3 can be performed in step S20, the process goes to step S21 and activation of the first ventilating fan 3 is switched to simultaneous activation of the second ventilating fan 4. Therefore, in step S23, the switch means 26 is turned on so as to electrically connect the solar battery 6 to the second ventilating fan 4 and thereby supply the electromotive force of the solar battery to the second ventilating fan 4. Thereafter, in step S23, it is determined whether the second ventilating fan 4 has been activated. If the second ventilating fan 4 has been activated, it is determined that an electromotive force exceeding the voltage current characteristics Y2 indicated by the broken line in FIG. 15 has been obtained and the voltage current characteristics Y will exceed at least the lower peak RB of the motor for the ventilating fans, thereby completing the process.

If it is determined in step S23 that the second ventilating fan 4 has not been activated, the switch means 26 is turned off so as to electrically disconnect the solar battery 6 and the second ventilating fan 4 and thereby suspend supply of the electromotive force from the solar battery 6 in step S24. Thereafter, in step S25, time counting of the timer portion 29t incorporated in the control means 29 is initiated, and an increase in the amount of sunlight is waited for a time T1, e.g., five minutes. Thereafter, if it is determined in step S26 that the time T1 has elapsed, the process returns to step S22, and the switch means 26 is turned on so as to electrically connect the solar battery 6 to the second ventilating fan and thereby supply the electromotive force to the second ventilating fan 4.

Thereafter, the processings from steps S23 to S26 are repeated until the second ventilating fan 4 is activated. In this way, when simultaneous activation of the d.c. motor has not succeeded and the d.c. motor has been locked, if a gradual increase in the amount of sunlight occurs afterwards to a level which ensures that the solar battery recovers an electromotive force represented by the voltage current characteristic Y2 which allow for simultaneous activation, locking of the d.c. motor can be released and the ventilating fans can thus be activated.

Figure 11:
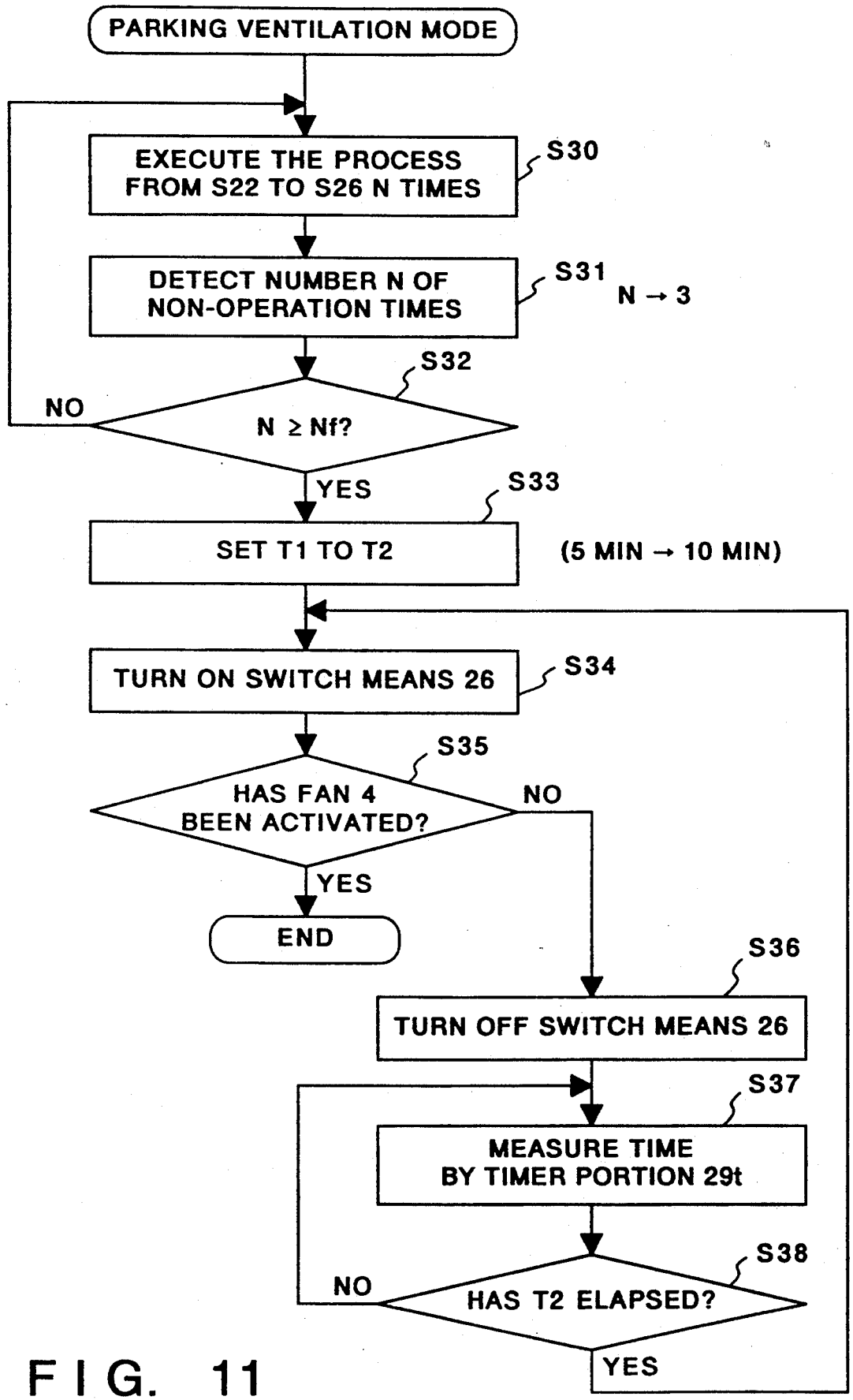

FIG. 11 is a flowchart showing a second example of the control operation in the parking ventilation mode. In this control operation, the processing from steps S22 to S26 in the first example shown in FIG. 10 is repeated first a number of times (N) preset in step S30. If the second ventilating fan 4 is not activated even after that processing has been executed N times, the process goes to step S31, and N is detected by the number of non-operation times detection means 28 as the number of times the ventilating fan has not been activated. Thereafter, in step S32, it is determined whether or not N is equal to or greater than a predetermined number of times Nf. If N is smaller than Nf, the process returns to step S30.

If N is equal to or greater than Nf (e.g., three times), the process goes to step S33 and the set time T1, e.g., five minutes, used in step S26 is changed to a set time T2 which is twice the set time T1 and which is 10 minutes. This setting is done to increase the time intervals at which turning on and off of the switch means 26 are controlled. Thereafter, the switch means 26 is turned on in step S34 so as to electrically connect the solar battery 6 to the second ventilating fan 4 and thereby supply the electromotive force of the solar battery to the ventilating fan. Next, it is determined in step S35 whether or not the second ventilating fan 4 has been activated. If the second ventilating fan 4 has been activated, it is determined that the amount of sunlight has increased to a level which ensures that the solar battery recovers an electromotive force exceeding the voltage current characteristics Y2 indicated by the broken line in FIG. 15 and that the voltage current characteristics Y will be able to exceed at least the lower second peak RB of the d.c. motor for the ventilating fans, thereby completing the process.

If it is determined in step S35 that activation of the second ventilating fan has not succeeded, the switch means 26 is turned off in step S36 so as to electrically disconnect the solar battery 6 from the second ventilating fan 4 and thereby suspend supply of the electromotive force from the solar battery 6 to the ventilating fan 4. Thereafter, time counting of the timer 29t incorporated in the control means 29 is initiated in step S37. Subsequently, in step S38, an increase in the amount of sunlight is awaited for the time T2 set by the set time changing means 30 in the aforementioned manner, which is 10 minutes. After the time T2 has elapsed, the process returns to step S34, and the switch means 26 is turned off so as to electrically connect the solar battery 6 to the second ventilating fan 4 and thereby supply the electromotive force of the solar battery to the ventilating fan 4.

Thereafter, execution of the processing from steps S30 to 38 is repeated until the second ventilating fan is activated. By increasing the set time in accordance with the number of non-operation times in the aforementioned manner, the second ventilating fan can be activated responsively, even when it takes a time for the amount of sunlight to increase.

Figure 12:
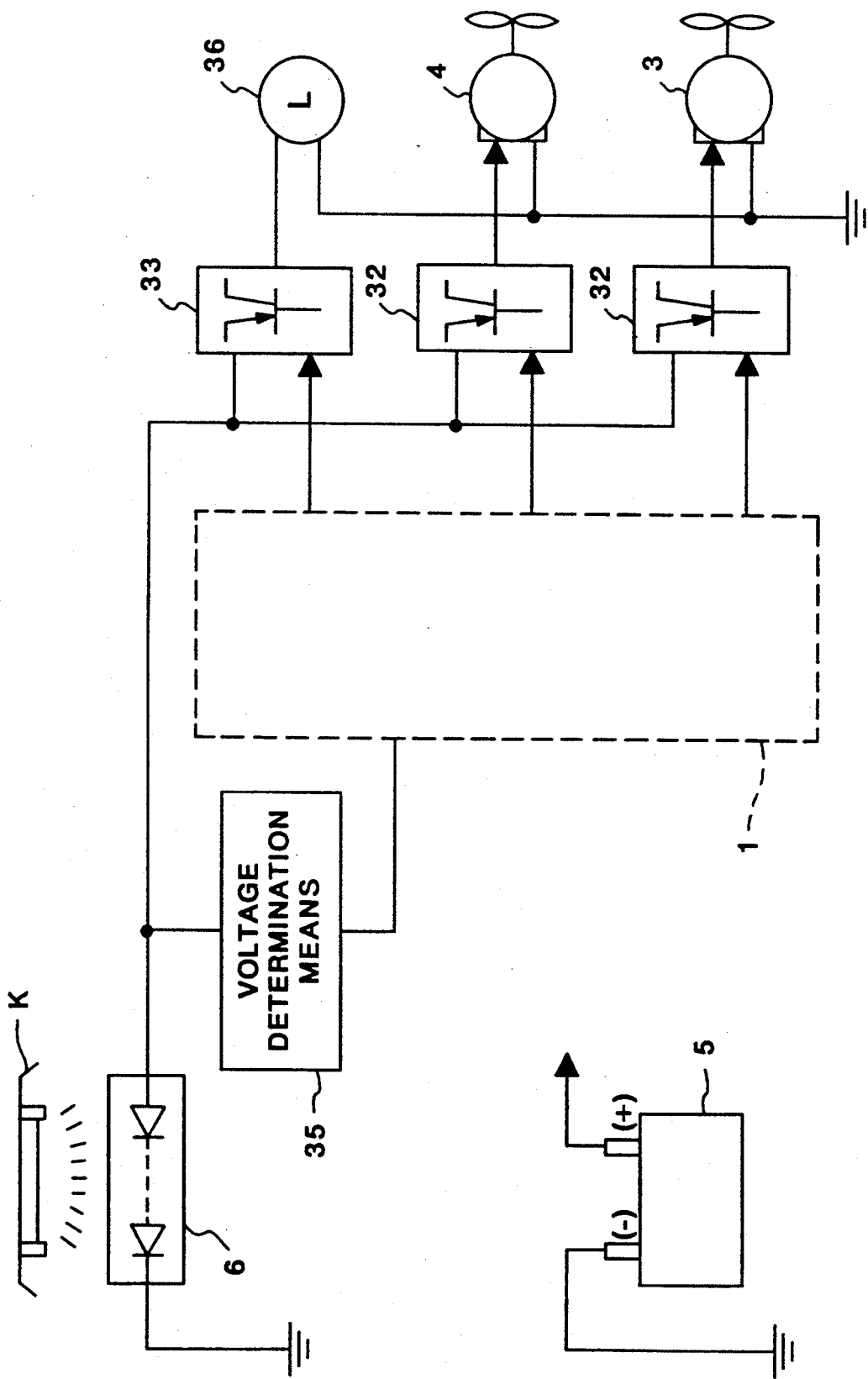
FIGS. 12 and 13 are block diagrams showing how disconnection inspection is conducted on the control device.
Figure 13:
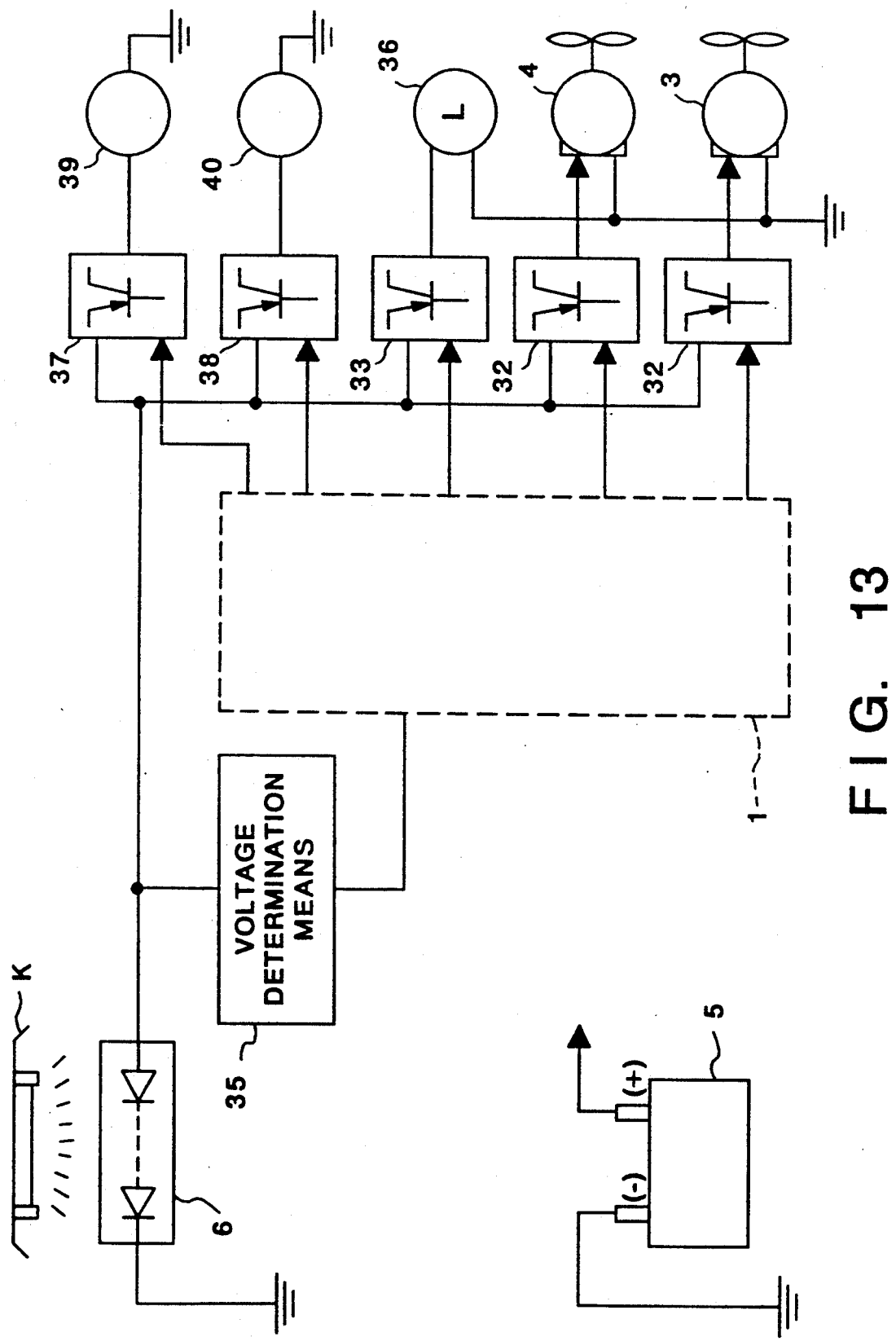

FIGS. 12 and 13 illustrate how disconnection inspection can be conducted on the ventilating fans and control device after the preliminary ventilating device has been mounted on a vehicle when it is impossible to obtain a sufficient amount of sunlight to drive the ventilating fans within a plant. In an example shown in FIG. 12, a fluorescent lamp K for irradiating an amount of light corresponding to an amount of sunlight not enough to drive to ventilating fans 3 and 4 is disposed near the solar battery 6. The solar battery 6 is connected to the ventilating vans 3 and 4 through the drivers 32. The solar battery 6 is also connected through a driver 33 to an alarm lamp 36 for alerting an abnormal voltage of the storage battery 5. Also, a voltage determination means 35 for measuring a voltage drop of loads, which are the ventilating fans and alarm lamp 36, is connected between the control device 1 indicated by the broken line and the solar battery 6.

In the aforementioned structure, an electromotive force of the solar battery 6 which is generated by a light from the fluorescent lamp K is sequentially applied to the drivers 32 and 33 by controlling the control device 1. Consequently, the solar battery 6 is electrically connected to the ventilating fans and alarm lamp in sequence. If a normal connection is provided between the solar battery 6 and each of the loads, a voltage drop corresponding to each load is measured by the voltage determination means 35. On the contrary, if there is a disconnection or a contact failure between the solar battery 6 and each of the loads, normal voltage drop does not occur, and disconnection is thereby detected.

Figure 14:
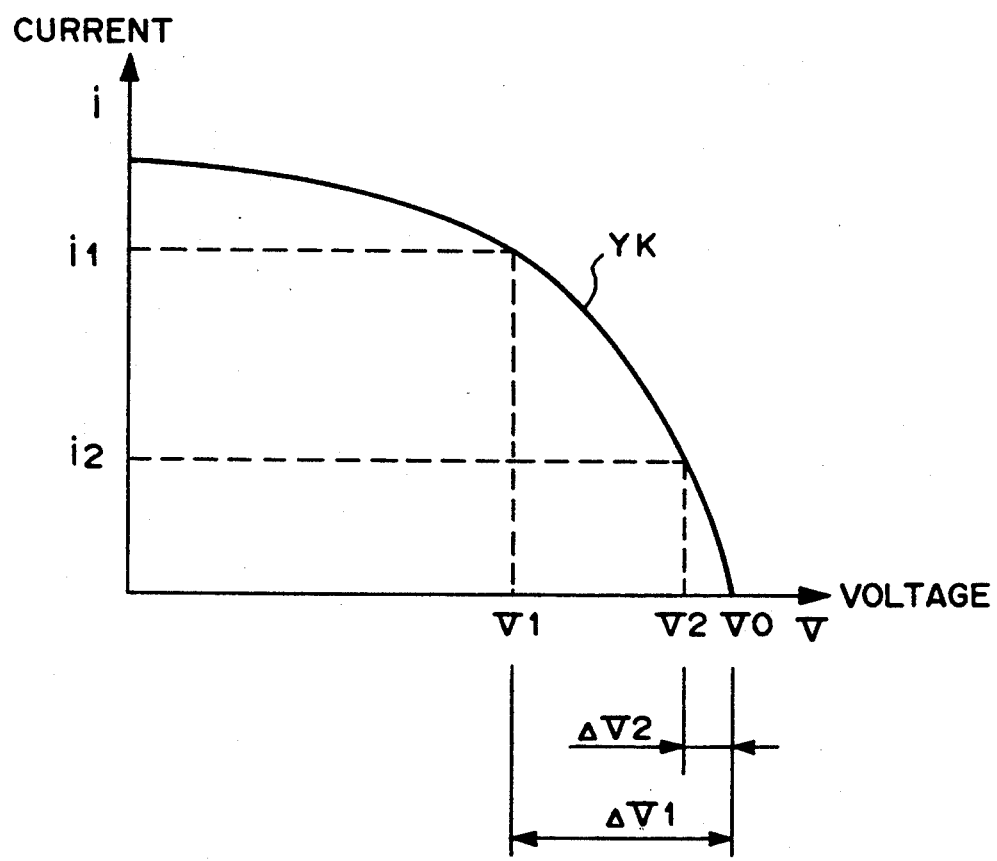
FIG. 14 is a graph showing a voltage-current curve Y of a solar battery and voltage drops caused by application of loads.

More specifically, when the light of the fluorescent lamp is illuminated to the solar battery, a voltage-current characteristic curve YK is obtained in a graph of FIG. 14 which shows a voltage-current characteristic curve of the solar battery as well as voltage drops caused by connection of loads. In that state, when the solar battery is electrically connected to the ventilating fans 3 and 4, a current i1 flows to the motor for the ventilating fans, and a voltage drop from the open voltage V0 of the solar battery to a voltage V1 thus occurs. This voltage drop $\Delta V1$ can be measured by the voltage determination means 35. When the solar battery 6 is electrically connected to the alarm lamp 36, a current i2 flows to the alarm lamp 36, and a voltage drop from the open voltage V0 to V2 occurs. This voltage drop $\Delta V2$ can similarly be measured by the voltage determination means 35. If the loads of the ventilating fans are different from each other, disconnection in the ventilating fans can be detected separately, allowing inspection of connection of the first and second ventilation fans to be performed separately. When there is a disconnection between each of the loads and the solar battery, the open voltage V0 is measured by the voltage determination means 35.

Thus, even when a sufficient amount of sunlight cannot be obtained from the light source, the disconnection site can be determined by sequentially connecting the solar battery to the loads.

Another example of disconnection inspection performed in the same situation as that of the aforementioned example will be described below with reference to FIG. 13. This configuration is similar to that shown in FIG. 12 with the exception that a first dummy load 40 for the ventilating fan motor having same load value as the ventilating fans 3 and 4 and a second dummy load 39 for the ventilating fan motor having the same load value as the alarm lamp 36 are further provided. These dummy loads 40 and 39 are connected to the solar battery 6 through drivers 38 and 37. The drivers 38 and 37 are connected to the control device 1 so that a signal from the control device 1 can be input to the drivers.

In the aforementioned structure, a voltage drop generated when the solar battery is electrically connected to the dummy loads 37 and 38 and a voltage drop generated when the solar battery 6 is electrically connected to the ventilating fans and alarm lamp are compared by the voltage determination means 35. If these voltage drops are substantially identical with each other, it is determined that connection between the solar battery and the loads, that is, the ventilating fans and the alarm lamp, is normal. If these voltage drops are not identical with each other, it is determined that there is a disconnection between the solar battery and the loads.

In other words, disconnection inspection of each load can be performed by comparing the voltage drop of the dummy loads with that of the actual loads. If the voltage determination means 35 and the dummy loads are programmed and such a program is stored in the control device 1 beforehand, provision of a special inspection device required in the inspection process is not necessary.

Having described out invention as related to the embodiment shown in the accompanying drawing, it is out intention that the invention be not limited by any of the details of description, unless otherwise specified, but rather be constructed broadly within its spirit and scope as set out in the accompanying claims.

As will be understood from the foregoing description, in the preliminary ventilating device for vehicles according to the present invention, ventilation can be reliably performed in the parking ventilation mode to reduce a high temperature of the air in the vehicle when a sufficient amount of sunlight cannot be obtained but when the temperature of the air in the vehicle is high.

Furthermore, ventilation can be performed reliably by a second ventilating fan as well as by a first ventilating fan to reduce the temperature of the air in the vehicle when the amount of sunlight has gradually increased.

Furthermore, the second ventilating fan can be activated at the earliest time even when it takes time for a sufficient amount of sunlight to activate the second ventilating fan to be obtained.

The present invention is not limited to the above embodiments and various changes and modifications can be made within the spirit and scope of the present invention. Therefore, to apprise the public of the scope of the present invention the following claims are made.

What is claimed is:

1. A preliminary ventilating device for a vehicle, said device having a control device connected to a solar battery, a storage battery, an operation means and a ventilation means, said preliminary ventilating device being able to be set by a change-over operation of said operation means to either of charging mode in which said storage battery is charged from said solar battery, forced exhaust mode in which said ventilation means is driven by power supplied from said storage battery, and parking ventilating mode in which said ventilation means is driven by an electromotive force supplied from said solar battery, said ventilation means including a plurality of ventilating fans driven by a d.c. motor, said preliminary ventilating device comprising:

a gradual starting means for activating a first ventilating fan in said ventilating fans by gradually increasing and continuously applying a voltage and a current from the electromotive force supplied from said solar battery; and a switch means for controlling simultaneous application of the voltage and the current from the electromotive force supplied from said solar battery to a second ventilating fan in the ventilating fans, wherein, when the parking ventilation mode is set, said switch means is operated to activate the second ventilating fan after the first ventilating fan has been activated by said gradual starting means.

2. A preliminary ventilating device for a vehicle according to claim 1, further comprising a control means connected to said switch means and having a timer means, and an activation detection means for detecting an activated state of said second ventilating fan, and wherein, when said activation detection means detects that said second ventilating fan is not activated by the operation of said switch means, passage of a predetermined time is checked by means of said timer means, and then the operation of said switch means is executed to activate said second ventilating fan.

3. A preliminary ventilating device for a vehicle according to claim 2, further comprising a number of non-operation times detection means for detecting a number of times the second ventilating van is not activated by the application of said switch means, and a set time changing means for increasing time intervals of the operation of said switch means when the number of non-operation times has reached a predetermined number of times, and wherein the operation of said switch means is repeated to activate the second ventilating fan.

4. A preliminary ventilating device for a vehicle according to claim 1 wherein said vehicle comprises a passenger car having at least a roof portion, and wherein said solar battery comprises an amorphous silicon solar battery which is disposed on said roof portion.

5. A preliminary ventilating device for a vehicle according to claim 1, wherein said solar battery exhibits a suitable transparency, and also serves as a window member for a sun roof which can be opened and closed.

6. A preliminary ventilating device for a vehicle according to claim 1, wherein said vehicle comprises a passenger car having at least a trunk, and wherein said control device is contained in a box container in a state wherein it is connected to said solar battery, said storage battery, said operation means and said ventilation means, said box container being disposed in said trunk.

7. A preliminary ventilating device for a vehicle according to claim 1, wherein said first and second ventilating fans are disposed on the two side portions in said trunk which are hidden by side portions of a rear bumper, said first and second ventilating fans being disposed in an intermediate portion of a duct means for communicating an interior of the vehicle with outside thereof to perform said ventilation.

8. A preliminary ventilating device for a vehicle according to claim 1, wherein said first and second ventilating fans each have a shutter means for preventing entry of outside air, said shutter means being automatically opened and closed by the ventilation.

9. A preliminary ventilating device for a vehicle according to claim 2, wherein said vehicle comprises a passenger car having at least a roof portion, and wherein said solar battery comprises an amorphous silicon solar battery which is disposed on said roof portion.

10. A preliminary ventilating device for a vehicle according to claim 3, wherein said vehicle comprises a passenger car having at least a roof portion, and wherein said solar battery comprises an amorphous silicon solar battery which is disposed on said roof portion.

11. A preliminary ventilating device for a vehicle according to claim 2, wherein said solar battery exhibits a suitable transparency, and also serves as a window member for a sun roof which can be opened and closed.

12. A preliminary ventilating device for a vehicle according to claim 3, wherein said solar battery exhibits a suitable transparency, and also serves as a window member for a sun roof which can be opened and closed.

13. A preliminary ventilating device for a vehicle according to claim 2, wherein said vehicle comprises a passenger car having at least a trunk, and wherein said control device is contained in a box container in a state wherein it is connected to said solar battery, said storage battery, said operation means and said ventilation means, said box container being disposed in said trunk.

14. A preliminary ventilating device for a vehicle according to claim 3, wherein said vehicle comprises a passenger car having at least a trunk, and wherein said control device is contained in a box container in a state wherein it is connected to said solar battery, said storage battery, said operation means and said ventilation means, said box container being disposed in said trunk.

15. A preliminary ventilating device for a vehicle according to claim 2, wherein said first and second ventilating fans are disposed on the two side portions in said trunk which are hidden by side portions of a rear bumper, said first and second ventilating fans being disposed in an intermediate portion of a duct means for communicating an interior of the vehicle with outside thereof to perform said ventilation.

16. A preliminary ventilating device for a vehicle according to claim 3, wherein said first and second ventilating fans are disposed on the two side portions in said trunk which are hidden by side portions of a rear bumper, said first and second ventilating fans being disposed in an intermediate portion of a duct means for communicating an interior of the vehicle with outside thereof to perform said ventilation.

17. A preliminary ventilating device for a vehicle according to claim 2, wherein said first and second ventilating fans each have a shutter means for preventing entry of outside air, said shutter means being automatically opened and closed by the ventilation.

18. A preliminary ventilating device for a vehicle according to claim 3, wherein said first and second ventilating fans each have a shutter means for preventing entry of outside air, said shutter means being automatically opened and closed by the ventilation.

19. A preliminary ventilating device for a vehicle having a solar battery, a ventilating fan driven by a fan motor and a switch means that turns on or turns off the fan motor, the device comprising:
  (a) detecting means for detecting the operation of the fan motor; and
  (b) fan motor control means for turning off the switch means when the non-operation of the fan motor is detected by the detecting means and for turning on the switch means after the elapse of a predetermined time so that the fan motor starts to operate.

* * * * *

UNITED STATES PATENT AND TRADEMARK OFFICE
CERTIFICATE OF CORRECTION

PATENT NO. : 5,205,781
DATED : April 27, 1993
INVENTOR(S) : YOSHIHISA KANNO, et al.

It is certified that error appears in the above-indentified patent and that said Letters Patent is hereby corrected as shown below:

Title page:  Column 2, line 4, after "454/900x", insert
--FOREIGN PATENT DOCUMENTS
59-51451  12/14/84  Japan
1-172016  7/6/89   Japan--

Col. 6,  line 19,  "7°C." s/b --7°C--;
         line 24,  "7°C. and 15°C.," s/b --7°C and 15°C,--;
         line 29,  "15°C." s/b --15°C--.

Col. 7,  line 12,  "7°C.," s/b --7°C,--;
         line 16,  "7°C.," s/b --7°C,--;
         line 18,  "7°C. and 15°C.," s/b --7°C and 15°C.--;
         line 19,  "15°C.," s/b --15°C,--;
         line 23,  "7°C. and 15°C.," s/b --7°C and 15°C,--;
         line 42,  "components In", sb --components. In--.

Signed and Sealed this

Fourth Day of October, 1994

Attest:

BRUCE LEHMAN

*Attesting Officer*    *Commissioner of Patents and Trademarks*